United States Patent
Trask

[15] 3,649,191
[45] Mar. 14, 1972

[54] PROCESS FOR MANUFACTURE OF NITROSYL CHLORIDE
[72] Inventor: James H. Trask, Wilmington, Del.
[73] Assignee: Hercules Incorporated, Wilmington, Del.
[22] Filed: Dec. 12, 1969
[21] Appl. No.: 884,426

[52] U.S. Cl. .................................................. 23/203 N
[51] Int. Cl. ........................................ C01b 21/00, C01b 21/52
[58] Field of Search ................. 23/203, 203 N, 157, 157 A

[56] References Cited

UNITED STATES PATENTS 3,443,898  5/1969   Sherwin et al. ................... 23/203 N
1,717,951  6/1929   Taylor .............................. 23/203 N Primary Examiner—Earl C. Thomas
Attorney—S. Grant Stewart

[57] ABSTRACT

A process for manufacture of nitrosyl chloride from chlorine and nitric oxide is provided. The reaction takes place with the reactants being in the gas phase and under conditions of turbulent gas flow. A molar excess of nitric oxide is employed.

10 Claims, 4 Drawing Figures

JAMES H. TRASK
INVENTOR

ATTORNEY

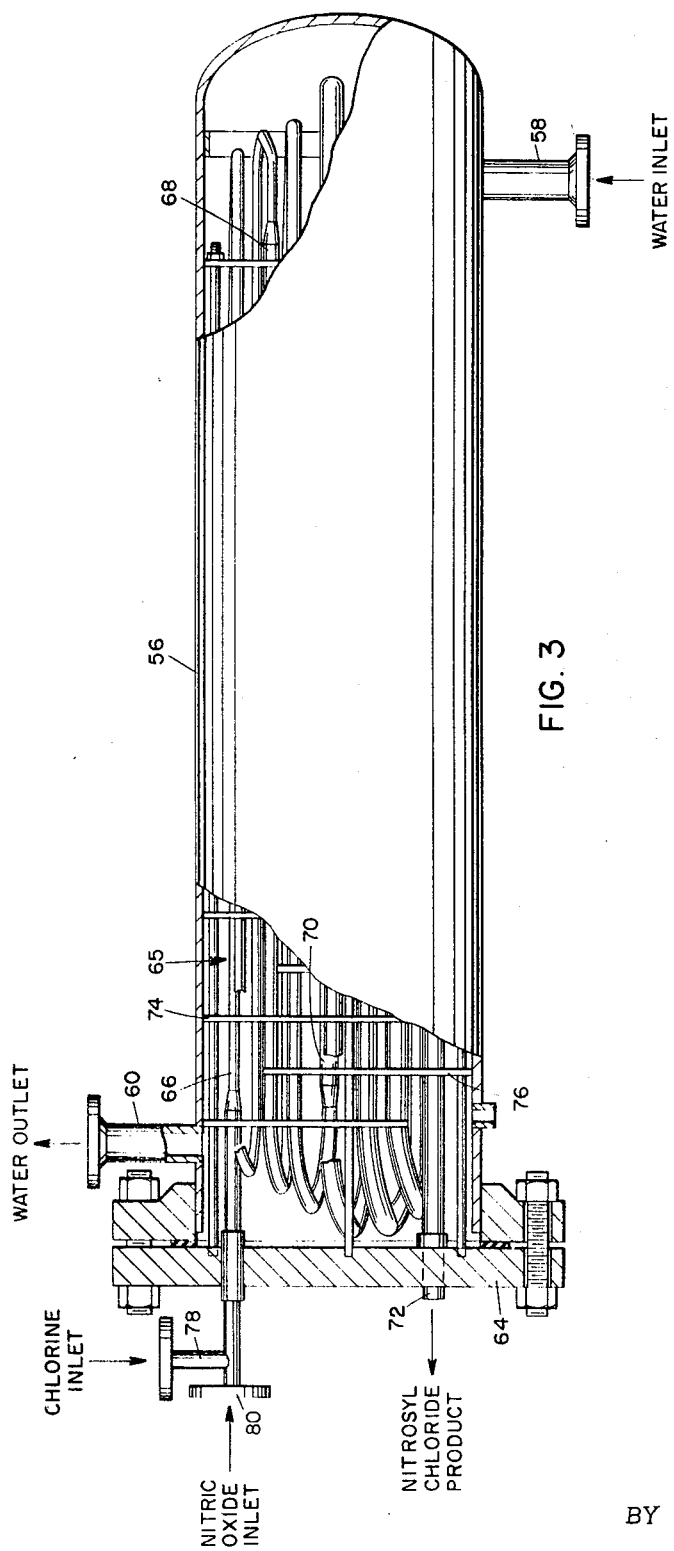
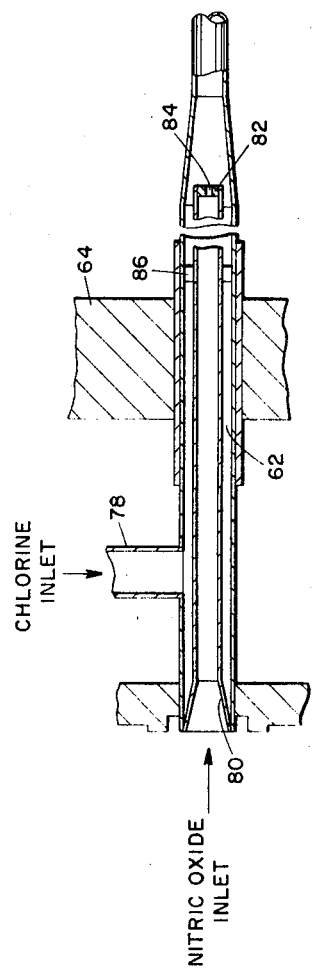

PROCESS FOR MANUFACTURE OF NITROSYL CHLORIDE

This invention relates to a vapor phase process for manufacture of nitrosyl chloride from nitric oxide and chlorine.

Nitrosyl chloride, NOCl, is gas at ambient conditions, which condenses to a liquid boiling at about −5.8° C. at atmospheric pressure. Nitrosyl chloride is used in the bleaching of flour, in the photooximation of hydrocarbons and as a chlorinating agent.

Various methods have been used for the production of nitrosyl chloride both commercially and in the laboratory. One commercial method involves the reaction of sodium chloride with nitric acid which produces sodium nitrate, chlorine, water, and nitrosyl chloride. Another method involves admitting nitric oxide gas into a vessel partially filled with liquid chlorine in which the chlorine in the vapor space reacts with the nitric oxide gas to form nitrosyl chloride which in turn condenses into the liquid chlorine. Nitric oxide is admitted continuously or intermittently until all the chlorine has been reacted. Another method utilizes a catalyst such as activated carbon or alumina through which a stoichiometric mixture of nitric oxide and chlorine is passed. The product is condensed and excess chlorine removed by fractionation.

Other methods for preparation of nitrosyl chloride using the reaction of nitric oxide and chlorine appear to have been employed only on a laboratory scale. One such technique employs liquid chlorine treated with excess nitric oxide with subsequent removal of the excess nitric oxide by repeated freezing and evacuating.

All the above processes suffer from problems not affecting the process of this invention. For example, in the commercial process to prepare nitrosyl chloride from reaction of sodium chloride with nitric acid, both water and nitrosyl chloride are produced which react to form aqua regia which is very highly corrosive. In those processes in which chlorine is a reaction product or the reaction products contain some unreacted chlorine, the purified product must contain chlorine somewhat in excess of the equilibrium quantity. Thus, the nitrosyl chloride must be purified to remove excess chlorine.

Accordingly, it is an object of this invention to provide a process for manufacture of high quality nitrosyl chloride containing less than about 0.2 percent chlorine dissolved therein.

It is another object of this invention to provide a process for manufacture of nitrosyl chloride wherein no catalyst is required.

It is a further object of this invention to provide an economical process for manufacture of nitrosyl chloride which avoids production of aqua regia as a byproduct.

Other objects of this invention will, in part, be obvious and will, in part, appear hereinafter. For a complete understanding of the nature and objects of this invention, reference is made to the following description, drawings and examples. Percentages wherever given are by weight and pressures given are gauge pressures unless otherwise specified.

In accordance with the process of this invention nitrosyl chloride is prepared by a method comprising admixing nitric oxide and chlorine in a reactor in the gas phase and under conditions of turbulent gas flow. The mole ratio of nitric oxide to chlorine must be in excess of the stoichimetric requirements. The reaction proceeds in accordance with Equation (1):

$$2NO + Cl_2 = 2NOCl \qquad (1)$$

The admixture of nitric oxide and chlorine is maintained within the reactor in the gas phase and under conditions of turbulent gas flow until substantially complete reaction of chlorine gas and nitric oxide has taken place. The gaseous reaction mass is then cooled to a temperature whereby there is formed a liquid phase and a gas phase, the liquid phase comprising nitrosyl chloride and the gas phase principally comprising nitric oxide and uncondensed nitrosyl chloride. The gas-liquid mixture is separated and the nitrosyl chloride recovered. The separated gas phase containing a high percentage of nitric oxide is recycled to the reactor for subsequent reaction.

The process of this invention is more fully described with reference to the process flow diagrams in which the description is made with reference to an example of plant operation. All percentages in the description which follows are by weight unless specified otherwise.

FIG. 3 is a side view partly broken away and partly in section illustrating the reactor employed in the process of this invention.

FIG. 4 is a detail illustrating chlorine and nitric oxide feed lines and mixing nozzle in the reactor.

Figure 1:
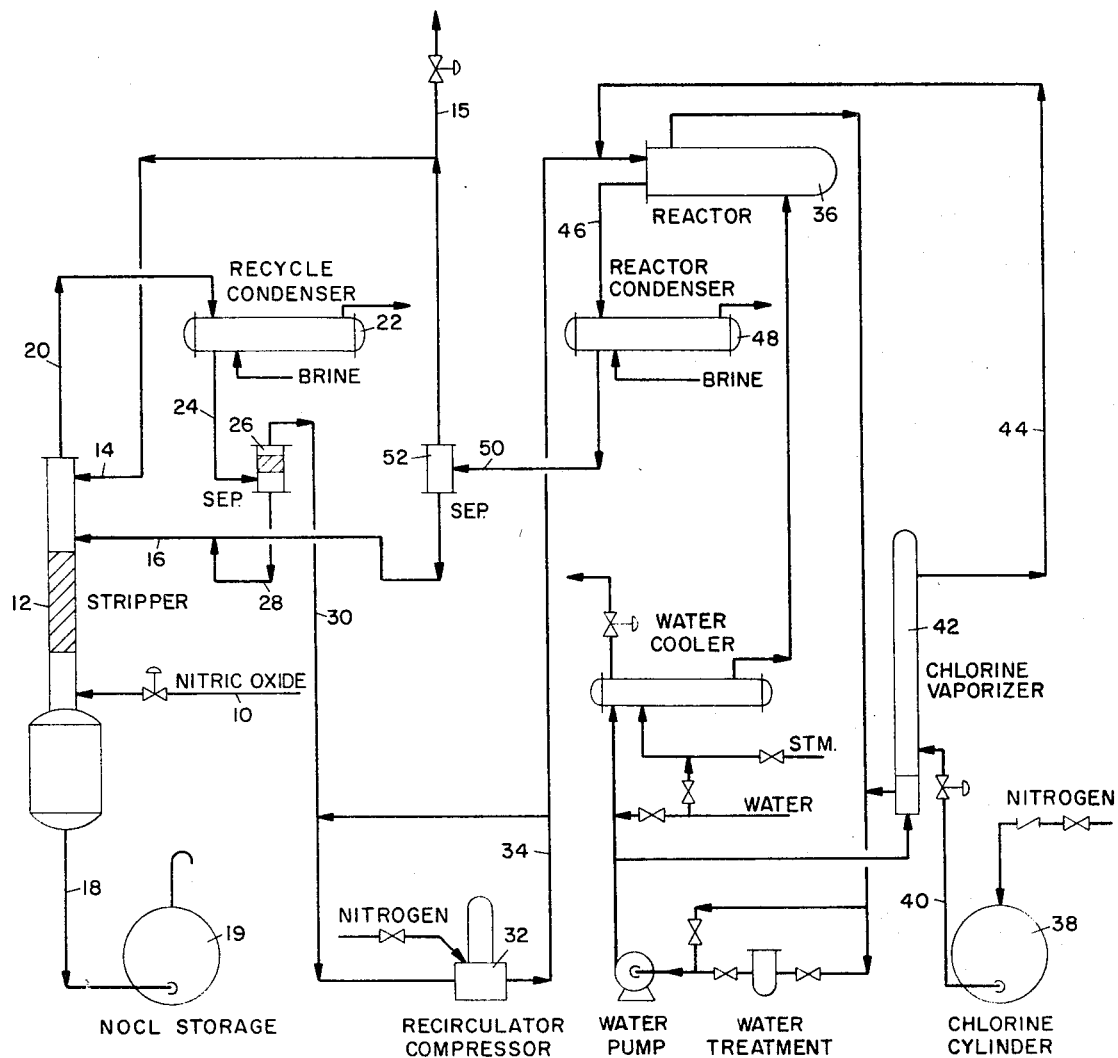
FIG. 1 is a flow diagram of the preferred process of this invention for preparation of nitrosyl chloride.

The process flow diagram of FIG. 1 is described assuming the process to be operating in a continuous and steady-state condition. Following the flow diagram of FIG. 1, 1.12 ft.$^3$/min. (c.f.m.) of nitric oxide at a pressure of 160 lbs./in.$^2$ (p.s.i.) and temperature at 60° F. (gaseous) is passed through conduit 10 into the bottom of a stripping column 12 which is a teflon lined pipe containing saddle packing. At the same time liquid nitrosyl chloride and recycle gas (produced by reaction fully described hereinafter) are fed into the top of stripping column 12 through conduits 14 and 16 at 160 p.s.i. and 60° F. and at rates of 0.17 gals./min. (g.p.m.) and 1.74 c.f.m. respectively. The nitric oxide gas passes in countercurrent flow to the nitrosyl chloride liquid and functions both to strip out and to react with dissolved chlorine in the nitrosyl chloride. High purity nitrosyl chloride product containing less than about 0.1 percent by weight chlorine is recovered as the bottoms product from the stripper 12 and passes through conduit 18 to storage cylinder 19 at a rate of 0.18 g.p.m. The overhead from stripper 12 is comprised of chlorine, nitric oxide gas saturated with nitrosyl chloride vapor and recycle gas. This mixed gas feed comprising 66 percent NO, 0.03 percent Cl$_2$, 24 percent NOCl and 10 percent N$_2$ by weight flows at a rate of 2.84 c.f.m. at a pressure of 159 p.s.i. at 60° F. through conduit 20 to a brine cooled (20° F.) recycle condenser 22 and through conduit 24 to a gas-liquid separator 26. Recycle condenser 22 cools the gases to about 25° F. liquifying about 66 percent of the nitrosyl chloride. Condensed liquid nitrosyl chloride is removed from gas-liquid separator 26 and is passed through conduit 28 into conduit 16 and is returned to stripper 12. The reactor feed gas leaving separator 26 through conduit 30 is comprised of about 71 percent of NO, 0.035 percent Cl$_2$, 18.6 percent NOCl and 10.3 percent N$_2$ by weight. The reactor feed gas flows at a rate of 2.56 c.f.m. at 158 p.s.i. and 25° F. through conduit 30 to recirculator compressor 32 where the reactor feed gas pressure is increased to 165 p.s.i. Nitrogen is introduced into the system at the recirculator compressor to prevent leakage of any process gases from the process system. The reactor feed gas leaves compressor 32 at a temperature of about 105° F. and is passed through conduit 34 into reactor 36.

Liquid chlorine stored in cylinders 38 at 185 p.s.i. at ambient temperature is fed through conduit 40 into the bottom of a chlorine vaporization tower 42 which is heated with hot water to a temperature of about 150° F. Vaporized chlorine gas at a pressure of 170 p.s.i. and 115° F. is passed through conduit 44 at a rate of 2.13 c.f.m. into reactor 36. The mole ratio of nitric oxide in reactor feed gas to chlorine gas entering reactor 36 from conduits 34 and 44 respectively is about 4/1. The temperature of the reaction is controlled within reactor 36 so that the temperature does not exceed 300° F. at any point within the reactor. The reactor effluent leaves reactor 36 through conduit 46 completely as a gas phase reaction mixture at a temperature of about 151° F. and a pressure of 161 p.s.i. The reactor effluent is comprised of 25 percent NO, 0.03 percent Cl$_2$, 67.5 percent NOCl and 9.2 percent N$_2$. The reactor effluent is cooled in reactor condenser 48 wherein 74 percent of the nitrosyl chloride is condensed. The cooled gas-liquid mixture is passed through conduit 50 into gas-liquid separator 52. The gas which is the process recycle gas is separated at a rate of 1.74 c.f.m. at a pressure of 160 p.s.i. and

a temperature of 60° F. and is comprised of 49.6 percent NO, 0.03 percent $Cl_2$, 35.45 percent NOCl and 14.90 percent $N_2$. This recycle gas enters stripper 12 through conduit 14 as previously described. Condensed liquid nitrosyl chloride which has not yet been stripped is separated at the rate of 0.17 g.p.m. and is comprised of 99.5 percent NOCl, and contains less than about 0.2 percent $Cl_2$.

Inert materials introduced into the process as impurities in the reactants, and nitrogen which can be introduced into the process as a sealing gas to prevent loss of process reactants from equipment such as the recirculating compressor, are allowed to build up in the recycle gas and are purged through conduit 15. This purge can be intermittent or continuous depending on the quantity of inert material entering the system.

The process as set forth with reference to flow diagram 1 was operated with all processing pressures lowered about 20 percent to about 125 p.s.i. The pressure at the discharge of recirculator compressor 32 was 131 p.s.i. The mixed feed gas comprising nitric oxide and recycle gas 34 was fed to the reactor 36 at a temperature of 89° F. Chlorine vapor was fed to the reactor at about 135 p.s.i. and 113° F. The reactor effluent leaves reactor 36 at a temperature of about 152° F. The mole ratio of nitric oxide to chlorine and flow rates throughout the process were maintained at about the same level as previously described. The nitrosyl chloride product recovered contained 99.8 percent NOCl, 0.06 percent $Cl_2$ and 0.09 percent $NO_2$.

Figure 2:
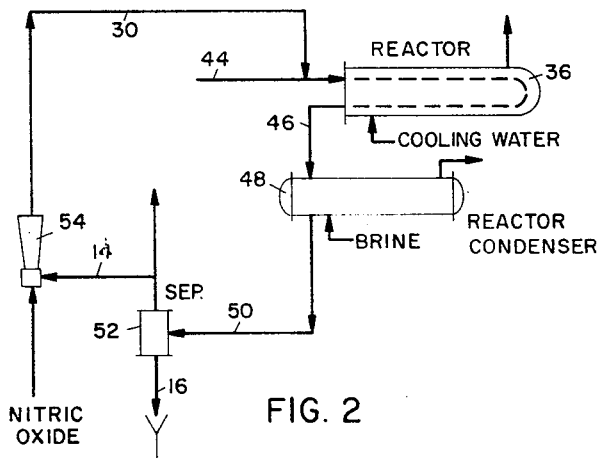
FIG. 2 is a simplified flow diagram illustrating a modified process flow diagram of the process of this invention.

In FIG. 2 an alternative process flow scheme is illustrated. This process scheme is the same basic process as illustrated in FIG. 1 with the exception that the stripper 12 and some associated equipment have been eliminated. Fresh nitric oxide gas and recycle gas are admixed and passed to reactor 36 by means of a jet eductor 54. In this process scheme the condensed liquid from gas-liquid separator 52 is comprised of nitrosyl chloride containing about 0.2 percent chlorine. When operating the process of this invention employing this process scheme, precise control of reactant flow rates, and process temperatures and pressures must be maintained, to ensure substantially complete reaction of chlorine within the reactor in order to obtain a quality nitrosyl chloride product, i.e., nitrosyl chloride containing less than about 0.2 percent by weight of dissolved chlorine.

In FIG. 3 the reactor 36 employed in the process as heretofore described is shown in detail. Reactor 36 is comprised of a reactor shell 56 having a cooling water inlet 58 and outlet 60. Chlorine and nitric oxide feed streams pass separately through inlet 62 in the reactor flange 64 as specifically shown in FIG. 4 and start mixing within the first tube section 66 of reactor tube 65. The reactor tube 65 is comprised of three sections 66, 68 and 70. These tube sections are joined together in order of increasing inside diameter. Reactor tube 65 is illustrated as broken to clearly show the increasing diameter of the tubing sections. Tube section 70 of reactor tube 65 passes through reactor flange 64 becoming outlet 72. The reactor 36 has alternating top baffles 74 and bottom baffles 76 spaced along its longitudinal axis said baffles defining a tortuous path for the cooling water passing through the reactor.

In FIG. 4 chlorine feed line 78 and nitric oxide feedline 80 are shown passing separately through inlet 62. The nitric oxide feedline 80 terminates with a sealing plate 82 having an orifice 84 therethrough. The nitric oxide feedline 80 and the chlorine feed line 78 passing through inlet 62 are spaced apart by thin support members 86. Initial mixing of chlorine and nitric oxide takes place immediately downstream of orifice 84.

The three tube sections comprising reactor tube 65 are made of tantalum and have the following lengths and inside diameters.

| Tube Section | Length (feet) | Inside Diameter (inches) |
| --- | --- | --- |
| 1 | 15.0 | 0.46 |
| 2 | 16.0 | 0.72 |
| 3 | 45.0 | 1.21 |

From the foregoing process description and examples, it is clear that several factors influence conditions for satisfactory operation of the process of this invention. These factors will be more readily appreciated in view of the discussion which follows.

The reaction between nitric oxide and chlorine is a true third order reaction. Accordingly, the reaction rate slows greatly as equilibrium is approached. Thus, in order to achieve high reaction rates it is necessary to employ a molar excess of nitric oxide, which aids in driving the reaction to completion. The molar excess of nitric oxide employed directly effects the residence time required to effect substantially complete reaction of chlorine and nitric oxide, reaction rates being faster with higher molar excess of nitric oxide. Residence time in turn effects reactor design, size of equipment and other factors which are readily appreciated by one skilled in the art. In general, it is necessary to employ as a minimum, a molar excess of nitric oxide to chlorine of about 3/1 to achieve the high conversion of chlorine to nitrosyl chloride. Preferred ratios of nitric oxide to chlorine are 4/1 or higher.

The reaction of nitric oxide and chlorine is highly exothermic. Reaction rate is a function of temperature, the reaction rate increasing with increasing temperature. Reaction rate in the vapor phase when employing the molar excess of nitric oxide set forth herein and when maintaining the gases in turbulent flow is very high due to the intimate contact of the reactants. Heat of reaction is dissipated as quickly as possible in order to maintain the reaction temperature below the corrosive limits of suitable materials of construction for the reactor. Reaction temperatures will vary within the tubular reactor heretofore described depending upon the effectiveness of the transfer of heat from the tubular reactor. It is generally preferred to maintain the maximum temperature within the tubular reactor at between about 200° F. and about 400° F.

The pressure and temperature of reaction of nitric oxide and chlorine are interrelated in that there is a minimum temperature required, depending on the mole ratio of reactants and operating pressure employed, to maintain the reactants and reaction product in the gas phase in the reactor. The preferred pressure range is from about 100 p.s.i. to about 200 p.s.i. when operating within the preferred range of temperatures. Reaction conditions must always be regulated so that nitric oxide, chlorine and product nitrosyl chloride are maintained within the reactor in the gas phase and in turbulent gas flow. By the term "turbulent gas flow" is meant that the Reynolds Number of the gases flowing at any point within the reactor is at least 4000.

The residence time of the gases flowing within the reactor will be varied depending upon the mole ratio of nitric oxide to chlorine, the degree of condensation of the reactor effluent which determines the quantity of recycle gas and the reactor temperature and pressure. The minimum residence time employed under any given set of process conditions must be such that substantially complete conversion of chlorine to nitrosyl chloride is obtained within the reactor. By the phrase "substantially complete conversion of chlorine" is meant that the reactor effluent contains less than 0.2 percent of unreacted chlorine. Residence times of from about 6 to about 12 seconds are generally satisfactory within the preferred operating temperature and pressure ranges specified herein.

The nitric oxide employed as a reactant in the process of this invention must be dry to prevent undesirable side reactions with nitrosyl chloride from occurring. The nitric oxide reactant has a maximum preferred dew point of about −50° F. The nitric oxide preferably contains less than about 50 p.p.m. of nitrogen dioxide. A suitable process for preparation of high quality nitric oxide for use in this process is set forth in a pending patent application of Frank E. deVry, Ser. No. 731,959 filed May 24, 1969. The chlorine employed as a reactant must be dry. Commercial grade chlorine is satisfactory.

It is generally preferred to operate the process of this invention according to the process described in the flow diagram of FIG. 1. Employing this process scheme, the condensed nitrosyl chloride coming from the reactor condenser and containing up to about 0.2 percent by weight of chlorine is stripped with nitric oxide gas. It is theorized that the nitric oxide gas functions both to strip out chlorine dissolved in the nitrosyl chloride and to react with some of the chlorine to produce additional nitrosyl chloride. Stripped nitrosyl chloride contains less than about 0.1 percent by weight of chlorine.

What I claim and desire to protect by Letters Patents is:

1. A process for manufacture of nitrosyl chloride comprising:
   a. admixing nitric oxide and chlorine in the gas phase in a reactor under conditions of turbulent gas flow characterized by a Reynold Number of at least 4,000 wherein the mole ratio of nitric oxide to chlorine is at least about 3/1 and maintaining said gaseous admixture in said turbulent flow until substantially all of the chlorine is converted to nitrosyl chloride in accordance with the reaction $2NO + Cl_2 = 2NOCl$,
   b. cooling the resulting reaction mass from step (a) to form a liquid phase comprising nitrosyl chloride and a gas phase comprising uncondensed nitrosyl chloride and unreacted nitric oxide,
   c. separating the liquid phase from the gas phase,
   d. recycling the gas phase from step (c) to the reactor of step (a), and
   e. recovering liquid nitrosyl chloride containing less than about 0.2 percent by weight of chlorine.

2. The process of claim 1 wherein the reactor pressure is from about 100 p.s.i. to about 200 p.s.i., the reactor maximum temperature is from about 200° F. to about 400° F., and residence time of the gases flowing through the reactor is from about 6 seconds to about 12 seconds, and the mole ratio of nitric oxide to chlorine is at least 4/1.

3. The process of claim 1 wherein the nitrosyl chloride product of step (e) is stripped of dissolved chlorine gas with nitric oxide, said process comprising first passing the nitric oxide gas into the bottom of a stripping column in countercurrent flow to a stream of the liquid nitrosyl chloride product producing an overhead product and a bottoms product, the bottoms product comprising stripped liquid nitrosyl chloride and the overhead product comprising chlorine and nitric oxide gas saturated with nitrosyl chloride and admixing the overhead product and the gas phase of step (c) to form a mixed gas feed and passing said mixed feed to the reactor of step (a).

4. The process of claim 3 wherein the mixed gas feed is passed through a condenser to form a liquid phase comprising nitrosyl chloride and a second gas phase comprising nitric oxide, nitrosyl chloride and chlorine; separating the phases; passing the gas phase to the reactor of step (a) and passing the liquid phase to the top of the stripping column.

5. The process of claim 4 wherein the mole ratio of nitric oxide to chlorine is at least 4/1.

6. The process of claim 5 wherein the reactor pressure is from about 100 p.s.i. to about 200 p.s.i.; the reactor maximum temperature is from about 200° F. to about 400° F., and the residence time of the gases flowing through the reactor is from about 6 seconds to about 12 seconds.

7. The process of claim 6 wherein the nitric oxide feed has a dew point of about −50° F.

8. A process for manufacture of nitrosyl chloride comprising admixing nitric oxide and chlorine in the gas phase in a reactor under conditions of turbulent gas flow characterized by a Reynolds Number of at least 4,000, the mole ratio of nitric oxide to chlorine being in excess of stoichiometric requirements and maintaining said gaseous admixture in said turbulent flow until substantially all of the chlorine is converted to nitrosyl chloride in accordance with the reaction $$2NO + Cl_2 = 2NOCl,$$

and recovering nitrosyl chloride.

9. The process of claim 8 wherein the mole ratio of nitric oxide to chlorine is at least about 3/1.

10. The process of claim 9 wherein the reactor pressure is from about 100 p.s.i. to about 200 p.s.i., the reactor maximum temperature is from about 200° F. to about 400° F., and the residence time of the gases flowing through the reactor is from about 6 seconds to about 12 seconds.

* * * * *